(12) United States Patent
Iezzi (10) Patent No.: US 11,874,249 B2
(45) Date of Patent: Jan. 16, 2024

(54) GRAPHITE BIOSENSOR AND CIRCUIT STRUCTURE AND METHOD OF MANUFACTURE

(71) Applicant: Mayo Foundation for Medical Education and Research, Rochester, MN (US)

(72) Inventor: Raymond Iezzi, Rochester, MN (US)

(73) Assignee: Mayo Foundation for Medical Education and Research, Rochester, MN (US)

( * ) Notice: Subject to any disclaimer, the term of this patent is extended or adjusted under 35 U.S.C. 154(b) by 766 days.

(21) Appl. No.: 16/636,801

(22) PCT Filed: Aug. 23, 2018

(86) PCT No.: PCT/US2018/047716
§ 371 (c)(1),
(2) Date: Feb. 5, 2020

(87) PCT Pub. No.: WO2019/040728
PCT Pub. Date: Feb. 28, 2019

(65) Prior Publication Data
US 2020/0393406 A1    Dec. 17, 2020

Related U.S. Application Data

(60) Provisional application No. 62/549,090, filed on Aug. 23, 2017.

(51) Int. Cl.
*G01N 27/414* (2006.01)
*G01N 27/327* (2006.01)
*B23K 26/14* (2014.01)

(52) U.S. Cl.
CPC ......... *G01N 27/4145* (2013.01); *B23K 26/14* (2013.01); *G01N 27/3276* (2013.01)

(58) Field of Classification Search
CPC .... C01B 32/20; C01B 32/182; G01N 27/414; B01D 71/0211; C23C 14/5806
See application file for complete search history.

(56) References Cited

U.S. PATENT DOCUMENTS 5,643,641 A * 7/1997 Turchan ................. C23C 26/00
427/249.14
2003/0135100 A1 7/2003 Kim et al.
(Continued)

FOREIGN PATENT DOCUMENTS

EP          2096435 A1      9/2009
WO       2015/175060 A2    11/2015
WO    WO-2016133571 A2 *  8/2016  ........... C01B 32/184

OTHER PUBLICATIONS

International Preliminary Report on Patentability received for PCT Patent Application No. PCT/US2018/047716, dated Mar. 5, 2020, 12 pages.
(Continued)

*Primary Examiner* — Nathaniel E Wiehe
*Assistant Examiner* — Spencer H. Kirkwood (57) ABSTRACT

Embodiments of the invention include a method for manufacturing sensors and circuit structures. The method can include providing a substrate including a layer of polymer capable of producing graphite in response to the application of energy, a first electrode adjacent to a first via location on the layer of polymer, and an insulating layer over at least a portion of the first electrode and the layer of polymer at the first via location; and applying sufficient energy to the layer of polymer at the first via location through the insulating layer to ablate the insulating layer and to form a first via as mass of graphite that extends into electrical contact with the first electrode and is surrounded by the insulating layer in a plane of the insulating layer.

6 Claims, 11 Drawing Sheets

(56) References Cited

U.S. PATENT DOCUMENTS

| | | |
|---|---|---|
| 2007/0135698 A1 | 6/2007 | Shah et al. |
| 2008/0164142 A1* | 7/2008 | Alvarez-Icaza .... G01N 27/3272 |
| | | 204/164 |
| 2010/0025264 A1* | 2/2010 | Yuan ..................... C12Q 1/005 |
| | | 204/403.14 |
| 2011/0092054 A1 | 4/2011 | Seo |
| 2012/0329193 A1 | 12/2012 | Guo |
| 2016/0133396 A1* | 5/2016 | Hsieh ..................... H01G 11/86 |
| | | 427/80 |
| 2019/0330064 A1* | 10/2019 | Tour ..................... B01D 67/006 |

OTHER PUBLICATIONS

International Search Report and Written Opinion received for PCT Patent Application No. PCT/US2018/047716, dated Nov. 26, 2018, 16 pages.

Lerner, Mitchell B., "Scalable Production of Highly Sensitive Nanosensors Based on Graphene Functionalized with a Designed G Protein-Coupled Receptor," Nano Letters, 14 American Chemical Society, 6 pages.

Tehrani, Farshad, "Facile and scalable disposable sensor based on laser engraved graphene for electrochemical detection of glucose," Scientific Reports, Published Jun. 16, 2016, 10 pages.

\* cited by examiner

GRAPHITE BIOSENSOR AND CIRCUIT STRUCTURE AND METHOD OF MANUFACTURE

CROSS-REFERENCE TO RELATED APPLICATION

This application claims is a national phase application of PCT Application No. PCT/US2018/047716, internationally filed on Aug. 23, 2018, which claims the benefit of Provisional Application No. 62/549,090, filed Aug. 23, 2017, both of which are incorporated herein by reference in their entireties for all purposes.

FIELD OF THE INVENTION

The invention relates to electronic devices such as circuit structures and sensors that include graphite material, and methods for manufacturing such devices.

BACKGROUND

Certain carbon-based materials such as graphite demonstrate graded conductivity, depending upon the application of an external gate voltage or electric field, making them suitable for electronic devices such as chemiresistive or field-effect sensors (e.g., biosensors). When appropriately modified, sensors of these types alter their conductance or resistance based upon the concentration of an analyte to which the device is exposed. Applications include, by way of example, gas concentration, pH, humidity and protein concentration measurements. There remains a continuing need for improved devices of these types and methods for manufacture. In particular, there is a need for such devices that are of high-quality and that can be manufactured by relatively efficient and reproducible processes.

SUMMARY

Embodiments of the invention include a method for manufacturing a sensor comprising (1) providing a polymer substrate capable of producing graphite in response to the application of energy, wherein the polymer substrate includes a pair of electrodes separated by a gap; and (2) applying sufficient energy to the substrate at the gap to form a mass of graphite extending across the gap and into electrical contact with the pair of electrodes. Providing a polymer substrate can include providing a polyimide substrate. Applying energy can include applying energy with a laser. Applying energy with a laser can include applying energy with a pulsed argon laser. In any of the above embodiments, applying energy can include applying energy to form a single microdot mass of graphite and/or a multiple microdot mass of graphite in any geometric configuration.

In yet other embodiments (1) providing the substrate includes providing a substrate including an insulating layer over at least portions of the substrate including the gap; and (2) applying energy includes applying energy through the insulating layer to form the mass of graphite that simultaneously ablates the insulating layer where the mass of graphite is formed and causes the insulating layer to surround the mass of graphite in the plane of the insulating layer (i.e., the side of the mass of graphite opposite the substrate is exposed through the insulating layer).

Embodiments of the invention also include a sensor fabricated in accordance with the methods of any of the above embodiments.

Other embodiments of the invention include a method, comprising (1) providing a substrate including a layer of polymer capable of producing graphite in response to the application of energy, a first electrode adjacent to a first via location on the layer of polymer, and an insulating layer over at least a portion of the first electrode and the layer of polymer at the first via location; and (2) applying sufficient energy to the layer of polymer at the first via location through the insulating layer to ablate the insulating layer and to form a first via as a mass of graphite that extends into electrical contact with the first electrode and is surrounded by the insulating layer in a plane of the insulating layer. Providing the substrate can comprise providing a substrate including a layer of polyimide as the polymer capable of producing graphite in response to the application of energy. In yet other embodiments (1) providing the substrate includes providing a substrate including a second electrode adjacent to a second via location on the layer of polyimide, and wherein the insulating layer is over at least a portion of the second electrode and the layer of polyimide at the second via location; and (2) the method further includes applying sufficient energy to the layer of polyimide at the second via location through the insulating layer to ablate the insulating layer and to form a second via as a mass of graphite that extends into electrical contact with the second electrode and is surrounded by the insulating layer in the plane of the insulating layer. Embodiments can further include applying a functionalized graphene structure to the substrate and electrically coupling the functionalized graphene structure to the first and second vias.

Embodiments of the invention also include a sensor and/or a circuit structure (e.g., an integrated circuit or circuit board) fabricated in accordance with the methods of any of the above embodiments.

DESCRIPTION OF THE INVENTION

Figure 1:
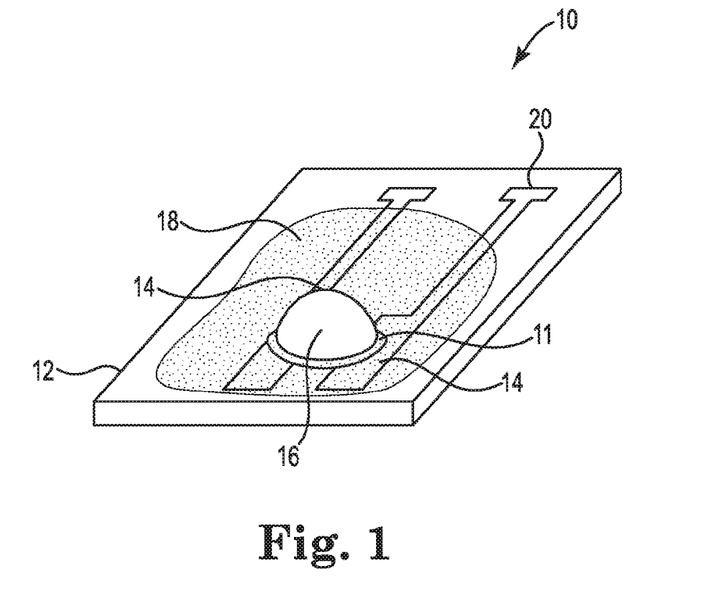
FIG. 1 is a diagrammatic illustration of a sensor in accordance with embodiments of the invention.

FIG. 1 is a diagrammatic illustration of a graphite sensor 10 in accordance with embodiments of the invention. As shown, sensor 10 includes a polymer substrate 12, a pair of spaced-apart conductive electrodes 14, and a mass or membrane of graphite 16 on the substrate that is in physical and electrical contact with both of the electrodes 14. A polymer insulating layer 18 covers at least portions of the sensor 10, while leaving at least portions of the graphite 16 uncovered so that the graphite can be exposed to an analyte during operation. In the embodiment shown in FIG. 1, a ring-shaped region 11 of the insulating layer 18 surrounds the base portion of the mass of graphite 16 (i.e., in the plane of the insulating layer). In other embodiments, greater or lesser amounts of the sensor 10 can be covered by the insulating layer 18. For example, the entire sensor 10, other than exposed portions of the graphite 16, can be encapsulated by insulating layer 18. Other embodiments do not include an insulating layer such as 18. Sensor 10 can be mounted to a base (e.g., polymer or metal not shown) in embodiments. Substrate 12 is polymer that, when exposed to energy such as a laser beam (e.g., a pulsed laser, a continuous output non-pulsed laser), will produce the graphite 16. In embodiments, the substrate 12 is polyimide such as Kapton®. Although shown as a planar member in FIG. 1, substrate 12 takes other forms (e.g., cylindrical, tubular) in other embodiments. Electrodes 14 are formed from conductive material such as graphite, gold (Au), copper (Cu) or alloys, and in the embodiment shown in FIG. 1 include leads and terminals 20 that can be used to electrically connect the sensor 10 to other electronic devices (e.g., to instruments that process the signals produced by the sensor). Adhesive material such as titanium (Ti) can be used as an adhesion layer to secure the electrodes 14 to the substrate 12. Graphite 16 is a self-organized amorphous carbon structure, and in embodiments is formed from the substrate 12 as described below. Insulating layer 18 is a material that provides a protective barrier or encapsulant for portions of the sensor 12 that are exposed to environments that might otherwise damage or interfere with the sensor during operation. For example, the insulating layer 18 can enable the sensor 10 to operate in liquid sensing environments. In embodiments, the material of insulating layer 18 is sufficiently transparent to energy, such as that provided by a laser beam, that it can enable the formation of the graphite 16 from the substrate 12 during fabrication of the sensor 10. In embodiments, insulating layer 18 is parylene. In other embodiments the insulating layer 18 can be other materials, including materials that are translucent or opaque.

Figure 2A:
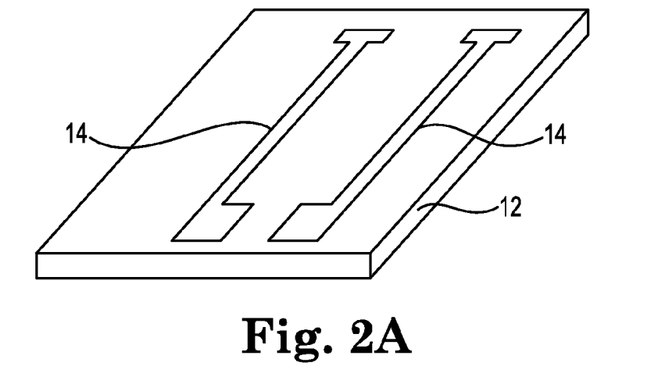
FIGS. 2A-2C illustrate a sequence of steps of a process in accordance with embodiments of the invention for fabricating sensors such as those shown in FIG. 1.
Figure 2B:
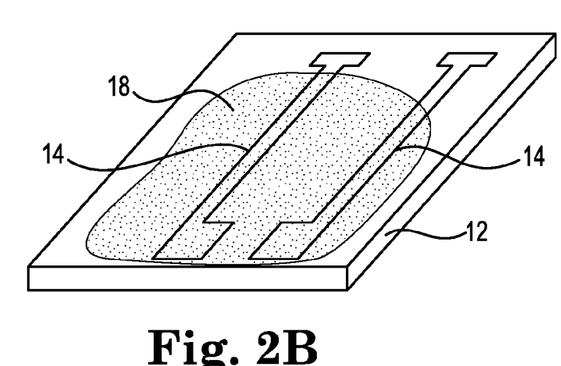
Figure 2C:
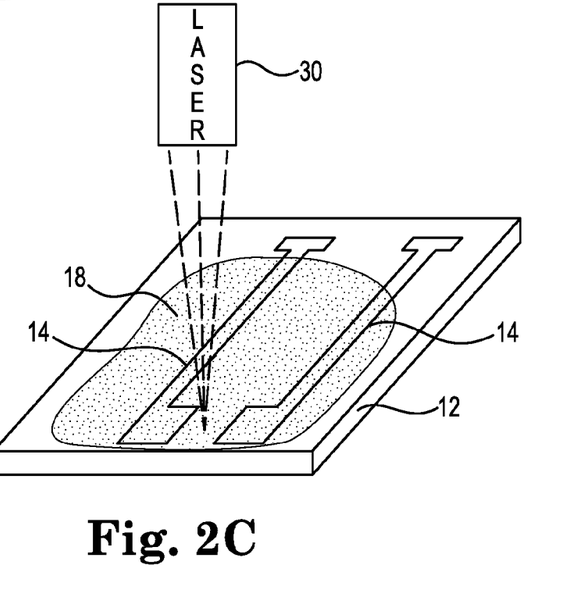

FIGS. 2A-2C illustrate a sequence of steps in accordance with an embodiment of a process that can be used to fabricate sensors 10. As shown in FIG. 2A, gold or other electrodes 14 are formed on the substrate 12. Conventional circuit forming methods including photolithography, electro- and electroless plating, chemical and dry etching, vapor deposition, spin coating, sputtering, printing and laser ablation processes can be used for this step. For example, in embodiments, photolithographic masking and electroplating processes can be used to deposit the conductive material film of the electrodes 14 in their desired circuit patterns onto the substrate 12. In other embodiments an area of the conductive material used for the electrodes 14 can be plated onto the substrate 12, and a laser (e.g., a femtosecond laser) can be used to ablate undesired portions of the conductive material and form the conductive material into the desired circuit patterns. In embodiments, the gap between the electrodes 14 at the location of the graphite 16 is about 30 µm. In other embodiments, the gap at the location of the graphite 16 is larger or smaller (e.g., between 1 nanometer and many centimeters). The layer thickness of the conductive material of the electrodes 14 can be about 100 nm in embodiments. Other embodiments have electrodes 14 that are thicker or thinner. The insulating layer 18 is about 2-3 µm thick in embodiments, but may be thicker or thinner.

As shown in FIG. 2B, the layer of insulating material 18 is applied over the portions of the sensor 10 that are desired to be encapsulated. In embodiments that use an insulating material 18 that is sufficiently transparent to the energy used to form the graphite 16, and as shown in the embodiment of FIG. 2B, the insulating material can be applied over the area of the substrate 12 at which the graphite is to be formed (e.g., the gap between the electrodes 14). In other embodiments, an insulating layer such as 18 is not applied to areas that the graphite 16 is formed. In yet other embodiments, a layer of insulating material such as 18 can be applied to the sensor 12 after the graphite 16 is formed.

Figure 6:
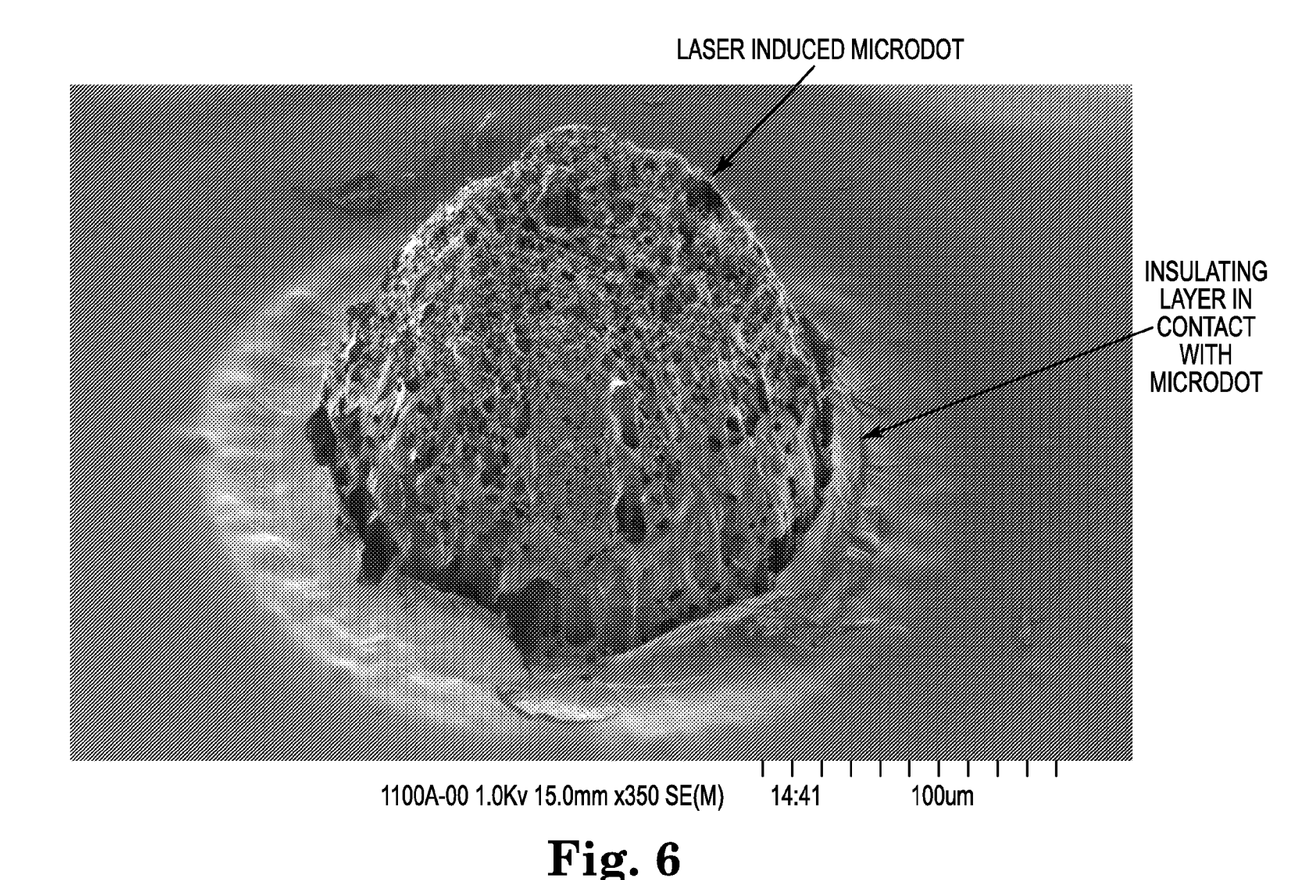
FIG. 6 is a scanning electron microscope (SEM) images of a graphite microdot in accordance with embodiments of the invention.
Figure 7:
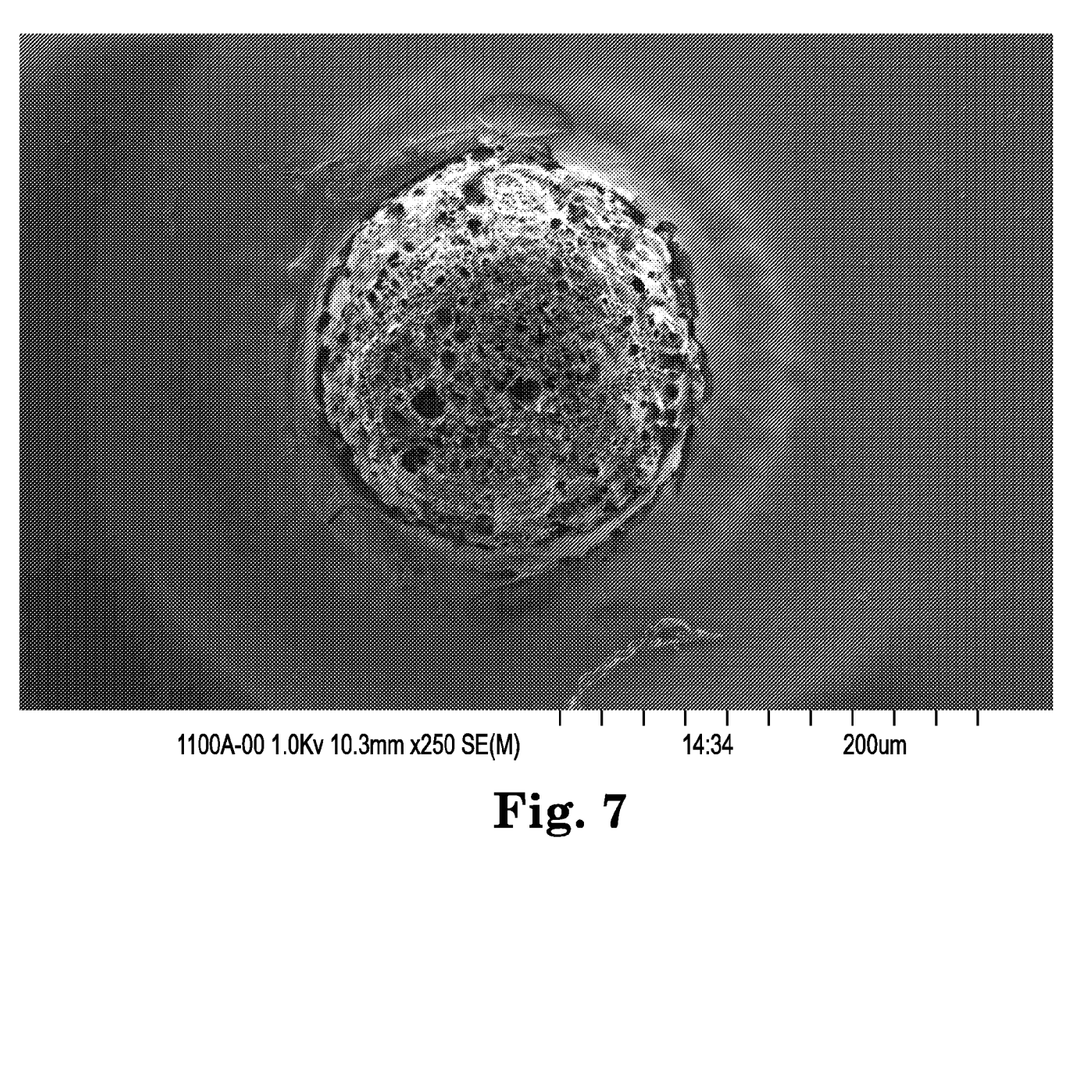
FIG. 7 is a scanning electron microscope (SEM) images of a graphite microdot in accordance with embodiments of the invention.

FIG. 2C illustrates the application of energy to the substrate 12 to form the mass or membrane of graphite 16. In embodiments, sufficient energy is applied to substrate 12 through the insulating layer 18 to cause the formation of the graphite 16 of sufficient size to contact both electrodes 14. In embodiments, a pulsed argon laser 30 is used to produce light energy that forms the graphite 16. By way of example, a 50 µm argon laser beam at a power level between about 100 mW and 2000 mW applied for about 10 msec or less has been used to induce the formation of masses of graphite 16 on 30 µm wide gaps (between the electrodes 14) of Kapton®. The graphite 16 of these examples extended across the gaps, and into physical and electrical contact with electrodes 14. The plasma and intense heat produced by the laser beam ablates the insulating layer 18 in the areas where the graphite 16 is formed, while leaving adjacent portions of the insulating layer intact. The plasma and heat of the laser beam can also melt the material of electrodes 14 to enhance the electrical connections. By this process, a heterostructure of graphite 16 is spontaneously formed and self-assembled on the sensor 10. The mass of graphite 16 is shown as a single microdot in FIG. 1. In embodiments such as those shown in the SEM images of FIGS. 6 and 7, the laser induced graphite microdot has a sponge-like porous and/or microporous structure (e.g., on the microdot surface), which increases the microdot total surface area in contact with the analyte sample for enhanced detection sensitivity. In other embodiments, graphite 16 includes a plurality of microdots that are separately formed (e.g., by relative movement of the laser 30 and substrate 12), yet in electrical contact with one another and with the electrodes 14. The number and size of the microdots constituting graphite 16, and the length or size of the gap between the electrodes 14, can be varied to establish the resistance or other electrical properties of the sensor 10, and thereby enable the sensor to be optimized for a range of applications. In embodiments, continuous application of laser irradiation can be used to create continuous structures of exposed graphite, insulated in lateral dimensions by the deposited insulation material.

Figure 3:
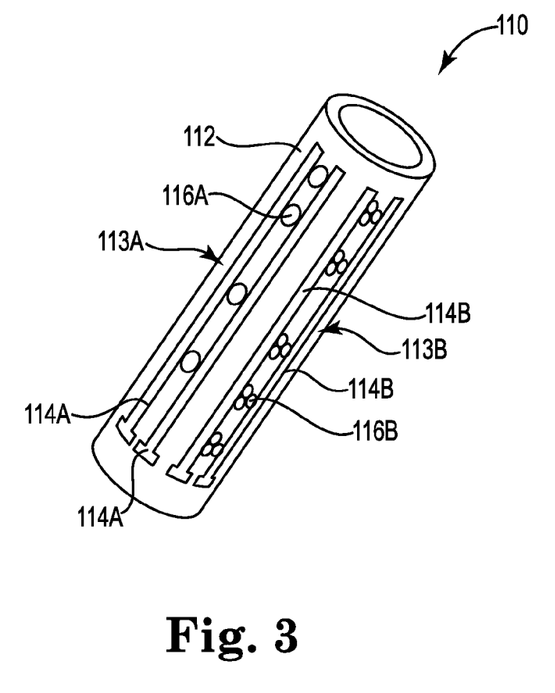
FIG. 3 is an illustration of a sensor in accordance with embodiments of the invention.

FIG. 3 illustrates a sensor 110 in accordance with embodiments. Sensor 110 is a multi-functional device that includes a tubular substrate 112 having several detectors 113A and 113B. Detector 113A includes electrodes 114A and a plurality of masses or membranes of graphite 116A. Similarly, detector 113B includes electrodes 114B, and a plurality of masses or membranes of graphite 116B. The membranes of graphite 116A are shown as single microdots, and the membranes of graphite 116B are shown as a plurality of microdots. The operating characteristics of detectors 113A and 113B can be different (e.g., optimized for different concentration ranges of a given analyte and/or for multiple different analytes). Sensor 110 can be fabricated using methods such as those described above in connection with sensor 10. In embodiments, the substrate 112 is a needle, and can also be used to inject or aspirate liquids or gasses. In embodiments, sensor 110 can be located within a hypodermic needle. In other embodiments the substrate is a solid cylinder (e.g., with no opening therethrough).

Figure 4:
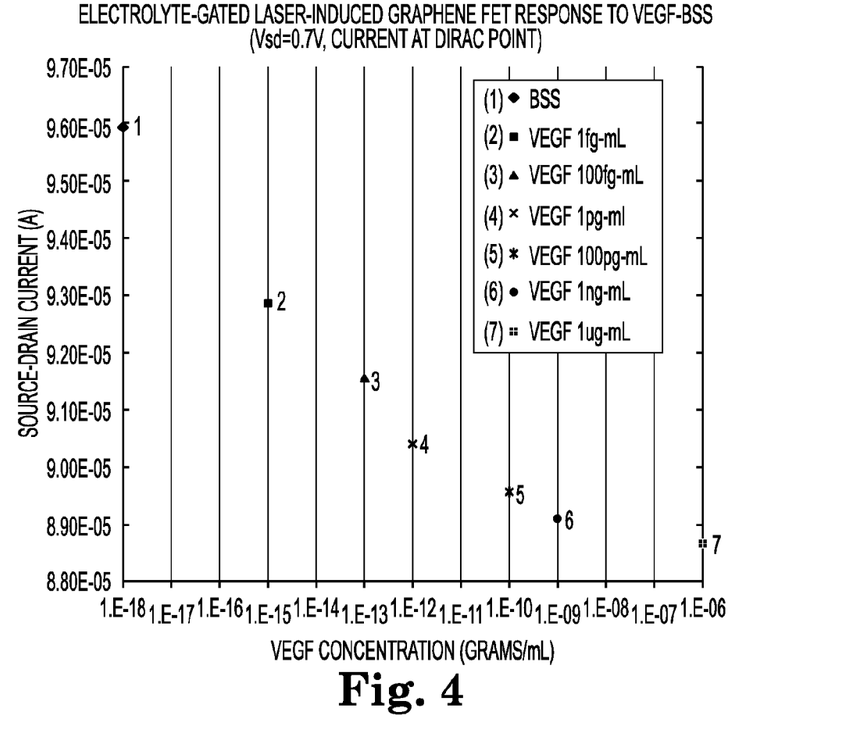
FIG. 4 is an illustration of the results of sensors in accordance with embodiments of the invention functionalized with an anti-VEGF antibody and operated as an electrolyte-gated graphite field effect transistor.
Figure 5:
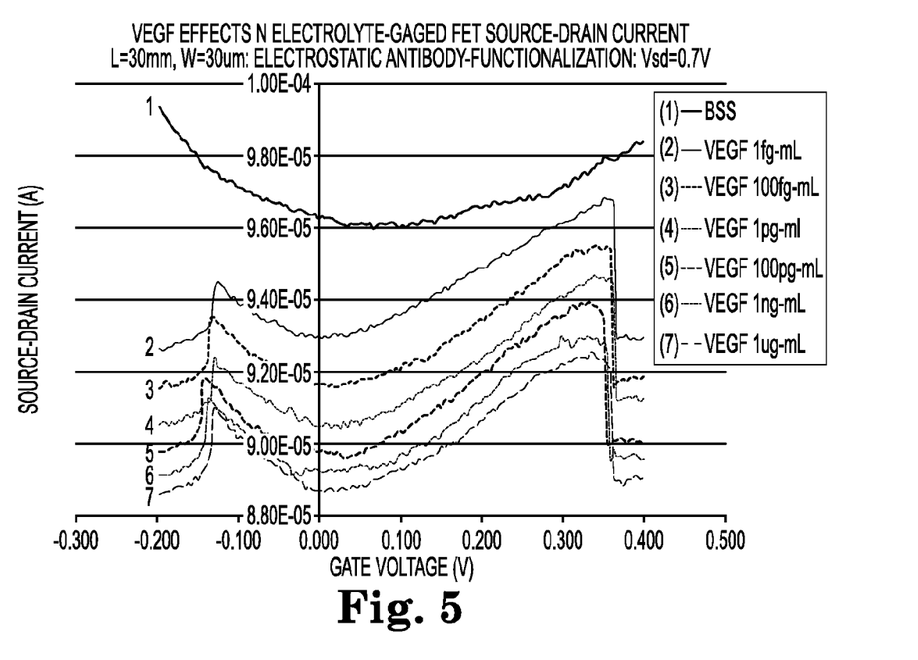
FIG. 5 is an illustration of electrical current change of sensors in accordance with embodiments of the invention in the form of an electrolyte-gated, laser-induced graphite field effect transistor to various concentrations of VEGF.

Sensors in accordance with embodiments of the invention having single microdot masses of graphite formed on Kapton substrates having 30 μm wide gaps between the electrodes and parylene insulating layers have been successfully demonstrated to respond to vascular endothelial-derived growth factor (VEGF). The detection of attomolar concentrations of VEGF in conductive solution that mimics body fluids was achieved, and demonstrates the suitability of the sensors for the detection of biomolecules in conductive media such as body fluids. FIG. 4 illustrates the results of these devices functionalized with an anti-VEGF antibody and operated as an electrolyte-gated graphite field effect transistor. Source-drain current was measured at 0.7 volts. A platinum wire gate electrode delivered gate voltage using a potentiostat, referenced to an Ag/Ag—Cl electrode. FIG. 5 illustrates electrical current change of such a device in the form of an electrolyte-gated, laser-induced graphite field effect transistor to various concentrations of VEGF. Source-drain current was measured across two gold electrodes in contact with the base of the graphite microdot. Gate voltage was swept from 0.4 volts to −0.2 volts using a platinum wire referenced to an Ag/AgCl electrode in the test solution.

Figure 8:
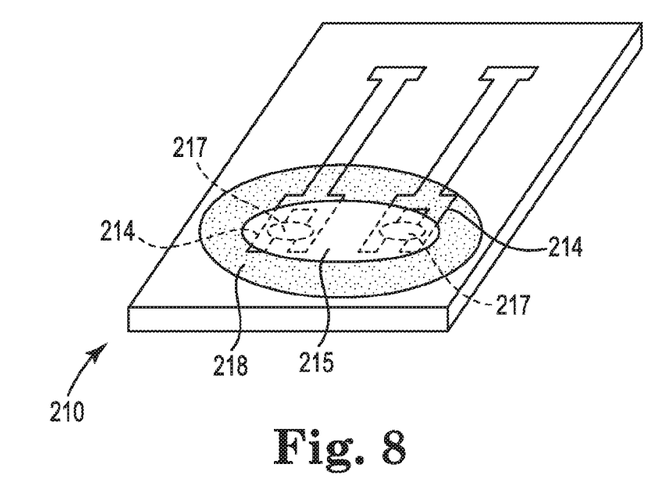
FIG. 8 is a diagrammatic illustration of a sensor in accordance with embodiments of the invention.

FIG. 8 is an illustration of a sensor 210 in accordance with embodiments. As shown, sensor 210 includes a polymer substrate 212, a pair of spaced-apart conductive electrodes 214 (which can be part of a circuit structure), and a functionalized graphene structure 215 extending between and in electrical contact with both of the electrodes. A laser-induced carbon via 217 couples each electrode 214 to the graphene structure 215. A polymer insulating layer 218 covers at least portions of the sensor 210, while leaving at least portion of the graphene structure 215 uncovered so that the graphene structure can be exposed to an analyte during operation. In other embodiments, greater or lesser amounts of the sensor 210 can be covered by the insulating layer 218. Yet other embodiments do not include an insulating layer such as 218. The sensor 210 can be mounted to a base (e.g., polymer or metal, not shown) in embodiments.

Similar to the sensor 10 described above, substrate 212 is a polymer that, when exposed to energy such as a laser beam, will produce the carbon (e.g., graphite) vias 217. In embodiments, the substrate 212 is Kapton. Electrodes 214 are formed from conductive material such as graphite, gold, copper or alloys, and in the embodiment shown in FIG. 8 include leads and terminals 220 that can be used to electrically connect the sensor 210 to other electronic devices. The end portions of the electrodes 214 shown in FIG. 8 are bifurcated and have a pair of spaced-apart legs. Other embodiments of the electrodes 214 have other shapes (e.g., a shape with an opening in or near the middle, or a single straight member).

Similar to sensor 10 described above, insulating layer 218 is a material that provides a protective barrier or encapsulant for portions of the sensor 210 that are exposed to environments that might otherwise damage or interfere with the sensor during operation. For example, the insulating layer 218 can enable the sensor 210 to operate in liquid sensing environments. In embodiments, the material of insulating layer 218 is sufficiently transparent to energy, such as that provided by a laser beam, that it can enable the formation of the conductive vias 217 from the substrate 212 during fabrication of the sensor 210. In embodiments, insulating layer 218 is Parylene (e.g., Parylene-C). In other embodiments the insulating layer 218 can be other materials, including materials that are translucent or opaque.

The functionalized graphene structure 215 includes a layer of graphene and an analyte-specific reagent. The analyte-specific reagent can be conventional or otherwise known materials. For example, in embodiments, the functionalized graphene structure 215 includes an antibody specific for an analyte. Blocking agents can also be included in the functionalized graphene structure 215. The graphene can be functionalized with an analyte-specific binding agent, and non-specific binding is blocked by the blocking agent. In one embodiment, the graphene structure may be functionalized using pyrene that is covalently bound to an analyte-specific binding agent. Pyrene binds to graphene via pi-pi interactions to form a strong bond, thus linking any ligand-specific binding agent to the underlying graphene substrate. Examples of analyte-specific binding agents may include, but are not limited to, antibodies, aptamers, small molecules, antigens, proteins, oligopeptides, nucleic acid sequences, lipids, enzymes, enzyme substrates or compounds modified by the action of other molecules. The graphite vias that interconnect overlying graphene layers to underlying metal electrodes such as gold may be larger than or smaller than any dimension of the overlying graphene structure.

Figure 9A:
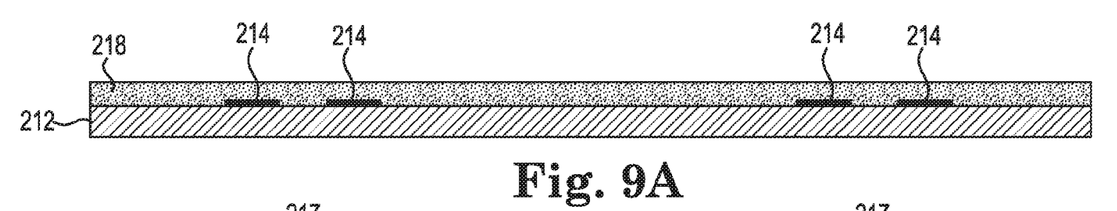
FIGS. 9A-9D illustrate a sequence of steps in accordance with embodiments of the invention for fabricating sensors such as those shown in FIG. 8.

FIGS. 9A-9D illustrate a sequence of steps in accordance with an embodiment of a process that can be used to fabricate sensors such as 210. As shown in FIG. 9A gold or other electrodes 214 are formed on the substrate 212. The layer of insulating material 218 is applied over the portions of the sensor 210 that are desired to be encapsulated. Conventional methods such as those described above in connection with sensor 10 can be used during this step.

Figure 9B:
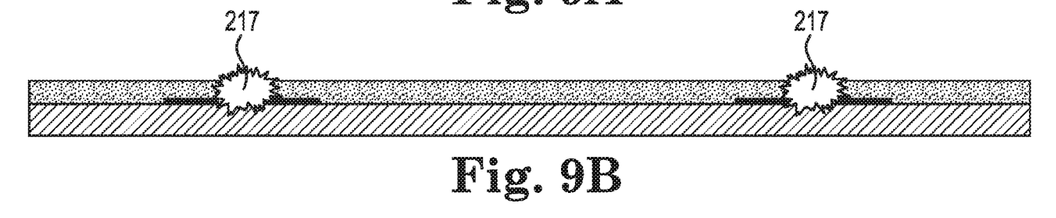

Vias 217 are formed at the electrodes 214 as shown in FIG. 9B. In embodiments, the vias 217 can be formed by methods that are the same as or similar to the methods described above to form the graphite 16 of sensor 10. By this approach, the vias 217 are formed as spontaneously insulated and wired structures. The vias 217 are located to be in electrical contact with the electrodes 214 and extend though the insulating material 218. The portions of the vias extending through the insulating material are surrounded by the insulating material (i.e., in the plane of the insulating material).

Figure 9C:
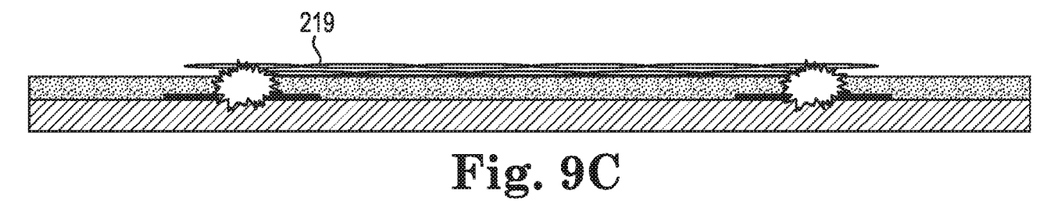
Figure 9D:
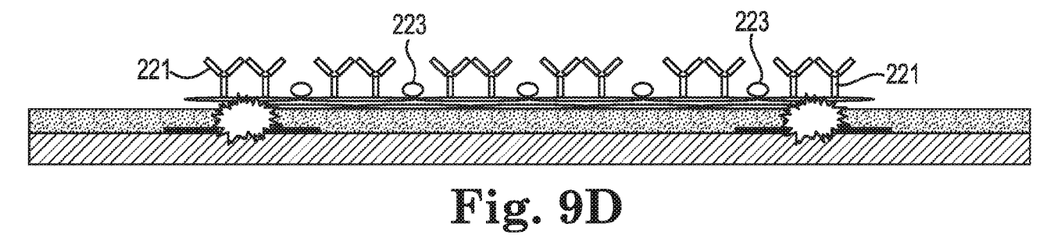
Figure 10A:
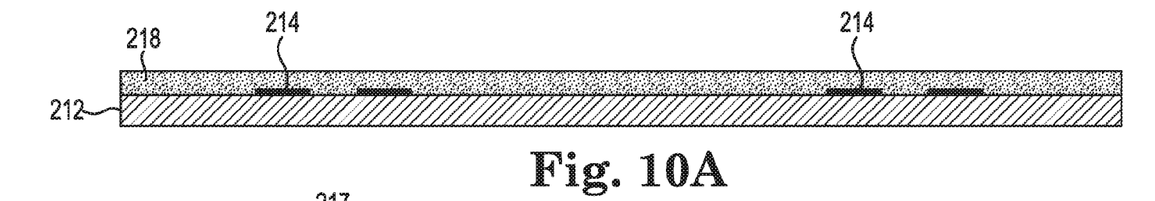
FIGS. 10A-10D illustrate a sequence of steps in accordance with embodiments of the invention for fabricating sensors.
Figure 10B:
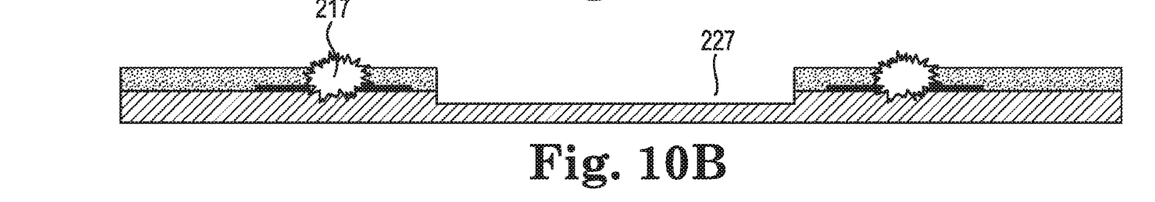
Figure 10C:
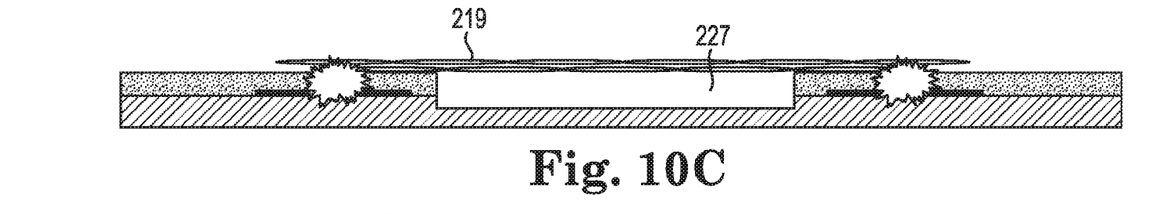
Figure 10D:
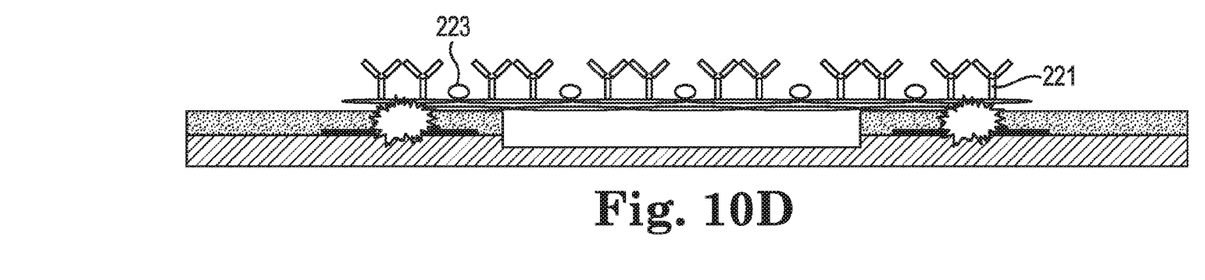

A layer of graphene 219 is applied to the device, and electrically coupled to both of the vias 217. Conventional manufacturing processes can be used to apply the layer of graphene 219. For example, the layer of graphene 219 can be formed directly on the insulating layer 218 and vias 217 by inkjet printing vapor deposition, sputtering or other processes. In other embodiments the layer of graphene 219 is formed apart from the substrate 212 and insulating layer 218, and is mounted to the insulating layer and vias 217 (e.g., and secured by adhesive or Van der Waals forces). As shown by FIG. 9D, the functionalized graphene structure 215 is formed by applying the analyte-specific reagent 221 and blocking agent 223. In other embodiments the layer of graphene 219 is functionalized before being applied to the insulating layer 218 and vias 217. In another embodiment, the graphene layer 219 may be applied onto the insulation and vias as a form of graphene oxide and exposed to highly energetic (e.g., 250-1250 Joules over 100 to 1000 microseconds) photons from a xenon flash lamp to reduce the graphene oxide to become graphene. The manufacturing steps described above can be performed during roll-to-roll processes.

FIGS. 10A-10D illustrate a sequence of steps in accordance with an embodiment of a process that can be used to fabricate sensors similar to those of sensor 210, but having a gap 227 between the terminals 214. In the illustrated embodiment, the gap 227 has a depth that is through the thickness of the insulating layer 218 and partially into the substrate 212. The gap 227 has other depths in other embodiments (e.g., only partially through the insulating layer 218 or not into the substrate 212. The gap 227 can be formed by a laser or other conventional process. Other than the gap 227, sensors manufactured by the processes illustrated in connection with FIGS. 10A-10D can be formed using processes similar to or the same as the processes described above in connection with FIGS. 9A-9D.

Figure 11:
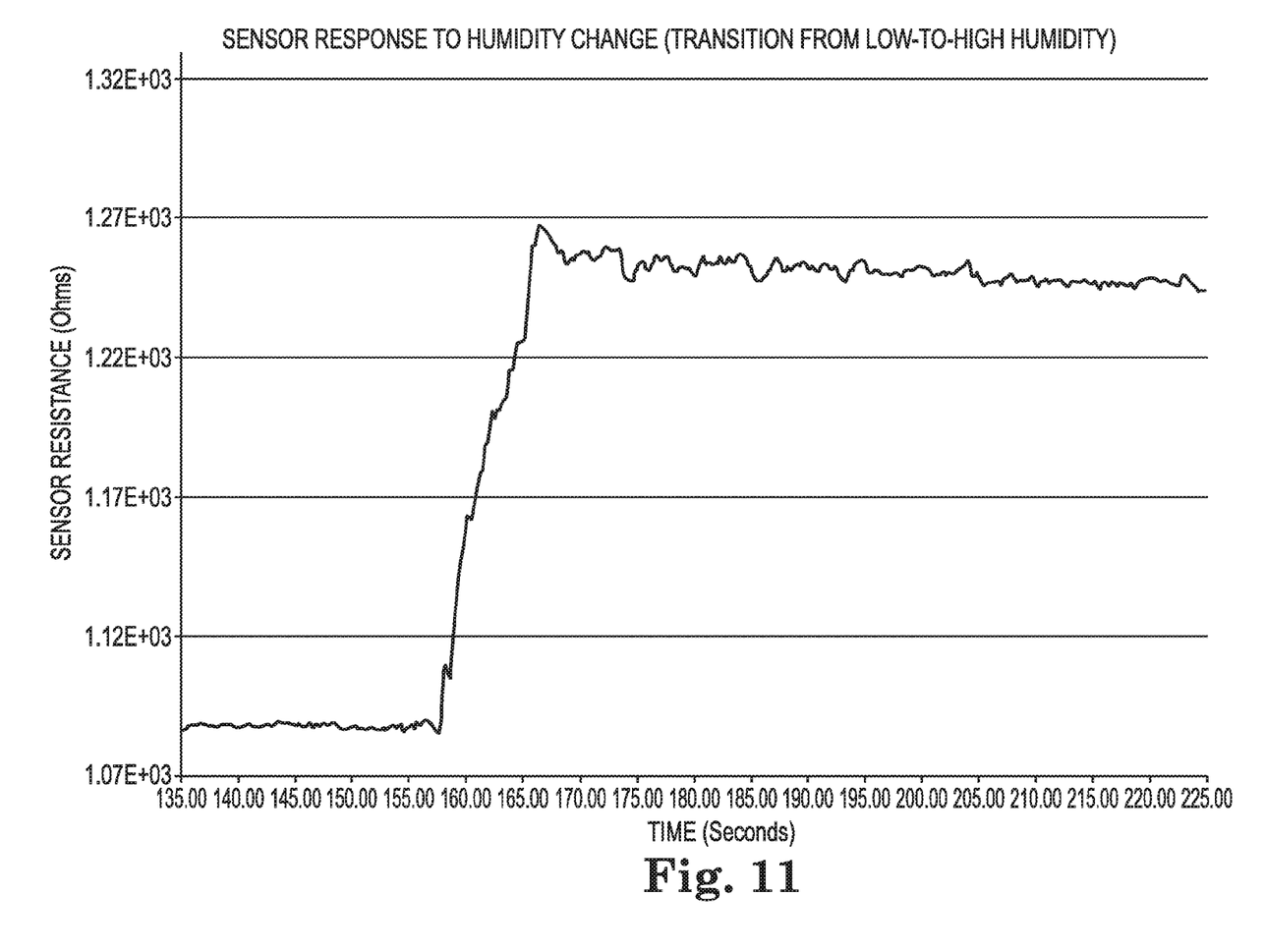
FIGS. 11 and 12 are graphs illustrating responses of sensors in accordance with embodiments of the invention to humidity change.
Figure 12:
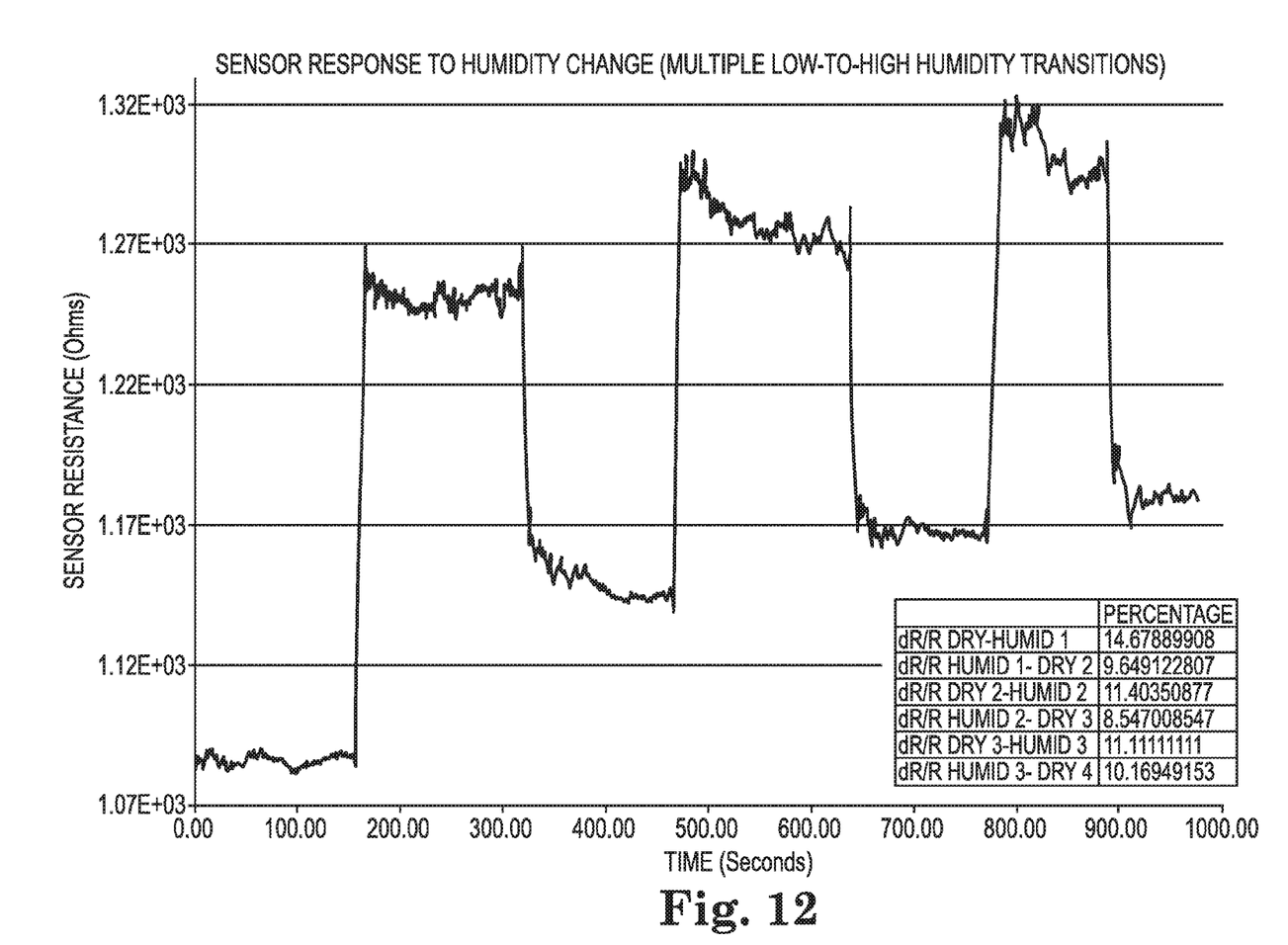

Sensors such as 210 can be operated as electrolyte-gated graphene field-effect (FET) transistors. For example, FIGS. 11 and 12, show the response of a sensor 210 functioning as a high-speed humidity sensor. The tested sensor 210 reflected in FIGS. 11 and 12 was formed from a 10 millimeter by 10 millimeter polyimide substrate 212, that was insulated using a 3 micrometer thick vapor-deposited parylene-C coating 218. The device 210 was connected to an Ohmmeter via vapor deposited gold terminals 214, that were patterned using a femtosecond laser. An argon laser was applied to sensor 210 in two locations to create two graphite vias 217 through the insulating layer 218. These two graphite vias formed heterostructures with the gold terminals 214 that spontaneously formed electrical contacts with these same gold terminals 214. The graphite vias were bridged by a 4 millimeter diameter layer of graphene 219. The graphene layer 219 was deposited using a nanomaterial-compatible inkjet printer upon the insulating layer 218 and over both of the graphite vias 217 to establish an electrical contact with both of the gold terminals 214. The graphene surface was functionalized with oxygen in the form of carboxylic acids and hydroxyl groups, thus allowing water vapor to act directly upon the Dirac Fermion electron cloud within the graphene layer to alter the semiconductor doping state, causing a conductance change between the gold source-drain terminals 214. These conductance changes, recorded using the Ohmmeter, were directly proportional to the water vapor content of the gas exposed to sensor 210. Humidity was varied between low and high levels as a function of time in seconds on the x-axis. The graph of FIG. 11 shows that the sensor responded in less than ten seconds. The graph of FIG. 12 shows the present response change to sensor resistance as a function of humidity change. For the tests that produced the results of FIGS. 11 and 12, the sensor was wired as a chemi-resistor to an ohmmeter. Resistance change was measured as a function of time as the applied air was changed from dry air to high-humidity air at 25 degrees Centigrade. Power dissipation within the device was maintained at 360 milliwatts.

Sensors 10 can be used in a wide range of applications. For example, they can be used as biosensors, and can be used to measure gas concentrations, pH, humidity and protein concentrations. Embodiments can be used in fluid (e.g., liquid and gas such as body fluids) settings. The sensors can provide accurate and repeatable measurements. They can also be efficiently fabricated, and tailored to a wide range of applications.

Other embodiments of sensors such as 210 have been demonstrated to be capable of measuring the concentration of sulfur hexafluoride (SF6) and perfluoropropane (C3F8) gas mixtures with room air. Gas mixtures of these types can be used in connection with retinal detachment repair. By filling the eye with a known concentration of these gasses, a "bandage-like" stabilization of the retina can be maintained while the eye heals after the vitreoretinal surgery. Vias formed by the methods described above have relatively low resistance, can be incorporated into circuit structures (e.g., integrated circuits without a functionalized graphene structure).

Although the invention has been described with reference to preferred embodiments, those of skill in the art will recognize that changes can be made in form and detail without departing from the spirit and scope of the invention. For example, sensors such as those described herein can be incorporated with other types of sensors.

The invention claimed is:

1. A method, comprising:
providing a substrate including a layer of polymer capable of producing graphite in response to the application of energy, a first electrode adjacent to a first via location on the layer of polymer, and an insulating layer over at least a portion of the first electrode and the layer of polymer at the first via location; and
applying sufficient energy to the layer of polymer at the first via location through the insulating layer to ablate the insulating layer and to form a first via as a mass of graphite that extends into electrical contact with the first electrode and is surrounded by the insulating layer in a plane of the insulating layer.

2. The method of claim 1 wherein providing the substrate includes providing a substrate including a layer of polyimide as the polymer capable of producing graphite in response to the application of energy.

3. The method of claim 2 wherein:
providing the substrate includes providing a substrate including a second electrode adjacent to a second via location on the layer of polyimide, and wherein the insulating layer is over at least a portion of the second electrode and the layer of polyimide at the second via location; and
the method further includes applying sufficient energy to the layer of polyimide at the second via location through the insulating layer to ablate the insulating layer and to form a second via as a mass of graphite that extends into electrical contact with the second electrode and is surrounded by the insulating layer in the plane of the insulating layer.

4. The method of claim 3 and further including applying a functionalized graphene structure to the substrate and electrically coupling the functionalized graphene structure to the first and second vias.

5. A sensor fabricated in accordance with the method of claim 1.

6. A circuit structure fabricated in accordance with the method of claim 1.

* * * * *